United States Patent
Kurtz et al.

(10) Patent No.: US 7,918,137 B2
(45) Date of Patent: Apr. 5, 2011

(54) METHOD FOR TEMPERATURE COMPENSATION OF A PIEZORESISTIVE GAGED METAL DIAPHRAGM

(75) Inventors: Anthony D. Kurtz, Saddle River, NJ (US); Joseph Van DeWeert, Maywood, NJ (US); Boaz Kochman, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 86 days.

(21) Appl. No.: 12/322,817

(22) Filed: Feb. 6, 2009

(65) Prior Publication Data

US 2010/0199775 A1 Aug. 12, 2010

(51) Int. Cl.
*G01L 9/06* (2006.01)
(52) U.S. Cl. ............................................. 73/721; 73/726
(58) Field of Classification Search .................. None
See application file for complete search history.

(56) References Cited

U.S. PATENT DOCUMENTS

| | | | |
|---|---|---|---|
| 3,245,252 A | 4/1966 | First et al. | |
| 6,700,473 B2 | 3/2004 | Kurtz et al. | |
| 6,810,745 B2 * | 11/2004 | Makino | 73/708 |
| 6,877,379 B2 | 4/2005 | Kurtz et al. | |
| 2002/0083776 A1 * | 7/2002 | Tanizawa | 73/753 |
| 2007/0113665 A1 * | 5/2007 | Johnson | 73/721 |

* cited by examiner

*Primary Examiner* — Andre J Allen
(74) *Attorney, Agent, or Firm* — James E. Schutz, Esq.; Dean Y. Shahriari; Troutman Sanders LLP

(57) ABSTRACT

There is described a temperature compensation scheme for a pressure sensitive metal diaphragm transducer. The transducer employs a Wheatstone bridge fabricated from p-type piezoresistors. The Wheatstone bridge is glassed directly onto the metal diaphragm. As the temperature of operation increases, the diaphragm exhibits a temperature variation of the Modulus of Elasticity. The Modulus of the metal diaphragm decreases with increasing temperature. Because of this, the same pressure applied to the metal diaphragm causes it to deflect further, which in turns causes increased strain applied to the bridge. Because of this effect, the sensitivity of the transducer increases with increasing temperature. A resistor is now placed in series with the Wheatstone bridge. The resistor is in series with the biasing voltage and because the TCS of the diaphragm is of an opposite sign, the series resistor has an even higher TCR in series with the bridge. In this manner, the bridge voltage is made to decrease with increasing temperature. Due to the fact that the bridge voltage decreases with increasing temperature the change in voltage compensates for the change in the Modulus of the metal diaphragm and therefore provides an accurate output at all temperatures.

9 Claims, 2 Drawing Sheets

METHOD FOR TEMPERATURE COMPENSATION OF A PIEZORESISTIVE GAGED METAL DIAPHRAGM

FIELD OF THE INVENTION

This invention relates to piezoresistive pressure transducers and more particularly to a method and apparatus for compensation of a piezoresistive gaged-metal diaphragm pressure transducer.

BACKGROUND OF THE INVENTION

Pressure transducers have been fabricated for operation at extremely high temperatures. In such transducers, one utilizes a metal diaphragm on the back of which is glassed a single network sensing element containing four piezoresistive strain gages. The gages are conventionally arranged in a Wheatstone bridge array. Upon the application of pressure, the diaphragm deflects slightly which induces strain onto the piezoresistors. The piezoresistors respond to this strain by a change of resistance. The four piezoresistors are arranged on the diaphragm such that two resistors are put in tension and the other two are placed in compression. This way, two resistors increase in value, while the others decrease in value by the same amount. This is well known. By connecting the two positive-going resistors on opposite arms of the Wheatstone bridge and doing likewise to the two negative-going resistors, the output of the Wheatstone bridge is a voltage which is proportional to the applied pressure. For high temperature operations, as indicated, the diaphragm is a metal diaphragm. See a co-pending application entitled High Temperature Pressure Transducer Employing Metal Diaphragm filed Jun. 15, 2006 as Ser. No. 11/453,445 for A. D. Kurtz et al, and assigned to Kulite Semiconductor Products, Inc., the assignee herein. In that application there is described a transducer utilizing a metal diaphragm and piezoresistors. The entire application is incorporated herein in its entirety. In regard to the above, the ratio or proportionality is known as the transducer sensitivity and is given by the following equation:

$$S = \frac{1}{P} \frac{V_{OUT}}{V_B} \quad (1)$$

S=Sensitivity
P=Applied Pressure
$V_{OUT}$=Output Voltage
$V_B$=Voltage applied to the bridge It is highly desirable that the output of the pressure transducer is sensitive only to pressure and is not affected by other environmental factors. A notable factor is temperature and therefore the sensitivity of the pressure transducer should be independent of temperature. Many factors affect the sensitivity of a particular transducer, including geometric, physical and electrical factors. Unfortunately some of these factors are indeed temperature dependant which leads directly to temperature variation in the sensitivity. Various schemes must then be utilized to minimize this temperature variation of the sensitivity. These schemes are collectively known as temperature compensation. As one will ascertain, the prior art is replete with a number of temperature compensation methods. See for example U.S. Pat. No. 6,877,379 issued on Apr. 12, 2005 and entitled Doubly Compensated Pressure Transducer issued to A. D. Kurtz et al and assigned to the assignee herein. That patent describes a compensated pressure transducer which has coarse and fine temperature compensation. See also U.S. Pat. No. 6,700,473 issued on Mar. 2, 2004 entitled Pressure Transducer Employing On-Chip Resistor Compensation to A. D. Kurtz, et al and assigned to the assignee herein. That patent describes a technique for compensating temperature in a pressure transducer. Thus as one will ascertain, there are many techniques described in the prior art to provide compensation of pressure transducers for temperature. In regard to the present transducer as described above, one employs a pressure sensitive metal diaphragm with a piezoresistive Wheatstone bridge glassed directly to the back of the diaphragm. In such an arrangement, it has been shown that the predominant factor which affects the temperature variation of the sensitivity is the temperature variation of the metal's Modulus of Elasticity. Generally speaking, the Modulus of Elasticity for a substance is the ratio of stress to strain within the elastic range of the substance. This range is where Hooke's Law is obeyed. In particular, the Modulus of a metal decreases with increasing temperature. With a smaller Modulus, the same pressure applied to the metal diaphragm causes it to deflect further, which in turn causes increased strain applied to the Wheatstone bridge. Because of this effect, the sensitivity of the transducer increases with increasing temperature. Another way to state this is that the transducers temperature coefficient of sensitivity (TCS) is positive. This is in contrast with an integrated all silicon pressure transducer where the TCS is dominated not by mechanical factors, but rather by electrical effects of the piezoresistors themselves. Integrated all silicon pressure transducers typically have a negative TCS. To compensate the output versus pressure of a sensor with a negative TCS requires a bridge voltage that increases with increasing temperature. This is accomplished by placing a resistor with a zero temperature coefficient in series with the bridge. This compensation scheme is described in detail in U.S. Pat. No. 3,245,252 entitled Temperature Compensated Semiconductor Strain Gage Unit issued on Apr. 12, 1966 to A. D. Kurtz, et al. Of course the TCS of a metal diaphragm transducer is of opposite sign than an integrated all silicon pressure transducer and therefore a different compensation scheme must be employed. The prior art solution utilizes a temperature independent resistor placed in series with the Wheatstone bridge will not work in the case where TCS is positive because the zero coefficient series resistor causes an increase in the bridge voltage as the temperature increases. This is desirable when the TCS is negative, but exactly the opposite of what is needed when the TCS is positive as in the case for metal diaphragm resistor. Thus the present invention is concerned with a method of compensating the piezoresistive gage metal diaphragm pressure transducer.

SUMMARY OF THE INVENTION

A method for compensating a pressure transducer of the type employing a metal diaphragm having bonded thereto a piezoresistive bridge array wherein the Modules of Elasticity of said metal diaphragm decreases with increasing temperature to undesirably increase the sensitivity of said transducer with increasing temperature, providing the steps of: decreasing the voltage applied to said bridge according to said increase in temperature to cause said sensitivity of said transducer to remain relatively stable with increasing temperature.

BRIEF DESCRIPTION OF THE FIGURES

FIG. 3 consists of FIGS. 3A and 3B.

DETAILED DESCRIPTION OF THE INVENTION

Figure 1:
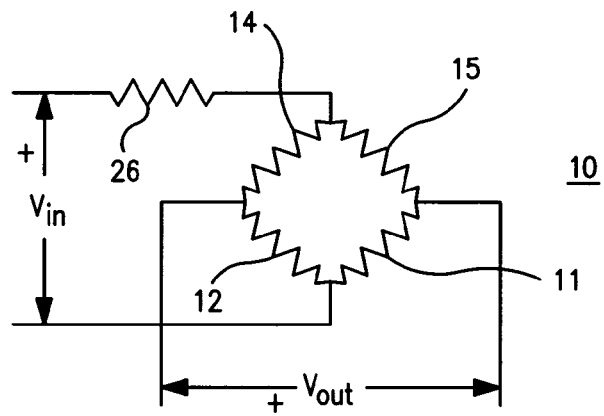
FIG. 1 is a schematic diagram showing a transducer bridge array being compensated according to this invention.

Referring to FIG. 1, there is shown a Wheatstone bridge 10. A Wheatstone bridge, as indicated, has four piezoresistors designated as 11, 12, 14 and 15. The bridge, as indicated above, is fabricated utilizing silicon piezoresistors, which elements have a positive temperature coefficient of resistance (TCR) by using a series resistor 20, which has an even higher TCR in series with the bridge, the bridge voltage is made to decrease with increasing temperature. As seen from FIG. 1, the bridge voltage designated as $V_{IN}$ is applied to bias the bridge which produces an output designated as $V_{OUT}$. In the arrangement shown in FIG. 1, the bridge output voltage is given by the following equation:

$$V_B = V_{IN} \frac{R_B}{R_B + R_S} \quad (2)$$

$V_B$ = Voltage applied to the bridge
$V_{IN}$ = Biasing Voltage
$R_B$ = Bridge Resistance
$R_S$ = Series Resistance ($R_{20}$)

As can be seen from the above equation, the resistance of the bridge increases with increasing temperature. The temperature coefficient $TCR_B$ is positive, the equation shows that if $TCR_S$ is likewise positive with a larger magnitude than $TCR_B$, $V_B$ can be made to decrease with temperature as desired. Therefore with a proper selection of the value of $R_S$ and $TCR_S$, the temperature variation of the sensitivity can be substantially reduced. The output of the circuit shown in FIG. 1 is given by the following equation:

$$V_{OUT} = V_{IN} \frac{R_B}{R_B + R_S} S \cdot P \quad (3)$$

S = Sensitivity
P = Applied Pressure

By manipulation of the above noted equation, it is possible to determine the temperature coefficient of the output which is given by the equation below:

$$TCV_{OUT} = TCS + TCR_S - \frac{R_S \cdot TCR_S + R_B \cdot TCR_B}{R_S + R_B} \quad (4)$$

$TCV_{OUT}$ = Temperature Coefficient of the Output
TCS = Temperature of Coefficient of Sensitivity Ideally it is desirable for the $TCV_{OUT}$ to be zero or as close as possible to zero. For any given transducer TCS, $TCR_S$, and $TCR_B$ can be easily measured. The measurements of course can be performed at two different temperatures whereby the difference in sensitivity is divided by the difference in temperature to obtain TCS. Thus by the careful selection of $R_S$ and $TCR_S$, $TCV_{OUT}$ can be set equal to zero, and therefore the temperature variation in the output voltage can be minimized. $TCR_S$ can be controlled by doping while $R_S$ can be controlled by geometry.

Figure 2:
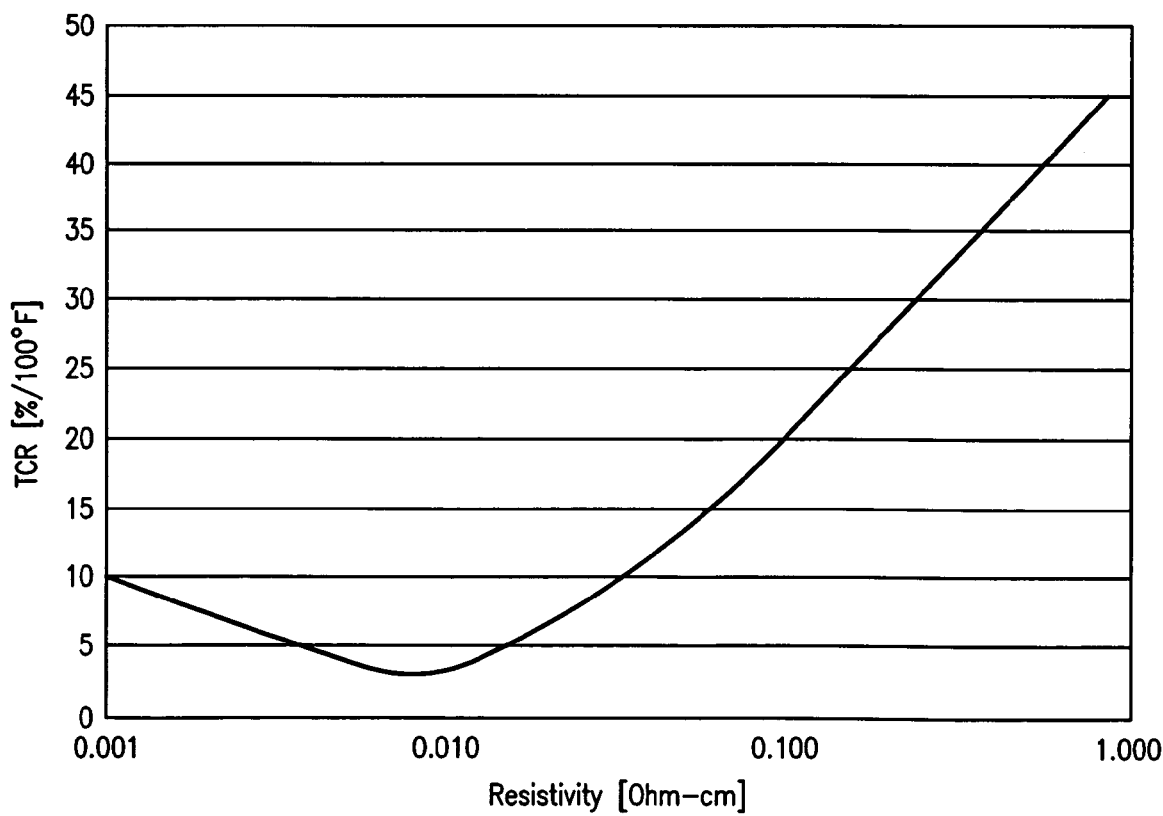
FIG. 2 is a graph depicting the TCR of p-type silicon.

The figure depicted in FIG. 2 displays the relationship between TCR and the resistivity of p-type (boron-doped) silicon. By selecting the appropriate material conductivity, which is controlled by the dopant density, a wide range of TCR can be achieved. As noted above, the compensation scheme requires that the TCR of the series resistor be larger than that of the bridge. For example resistivity of the bridge can be chosen to be about 0.001 ohms-centimeter, while the resistivity of the series resistor can be chosen to be about 0.1 ohms-centimeter. This results in the TCR of the series resistor to be about twice that of the bridge, 20%/100° F. and 10%/100° F. respectively. If for example the TCS of the bridge is +4% per 100° F., equation 4 is the result that the ratio of the series resistance to the bridge resistance should be approximately 0.7. Reference is made to FIG. 2. It should be noted that for this compensation scheme to be effective, it is critical that the Wheatstone bridge and temperature measuring resistor are always at the same temperature. Thus when glassing the bridge onto the metal diaphragm, the temperature measuring resistor should be glassed onto the metal diaphragm at the same time and placed as close to the bridge as possible. This is shown in FIG. 3. Alternatively, the bridge and temperature resistor can be fabricated on a single chip. However, the two must have different TCR's so the doping is different. Because the compensation resistor may be placed on the diaphragm it must be strain insensitive. This can be accomplished by choosing the correct crystallographic orientation of the silicon resistor.

Figure 3A:
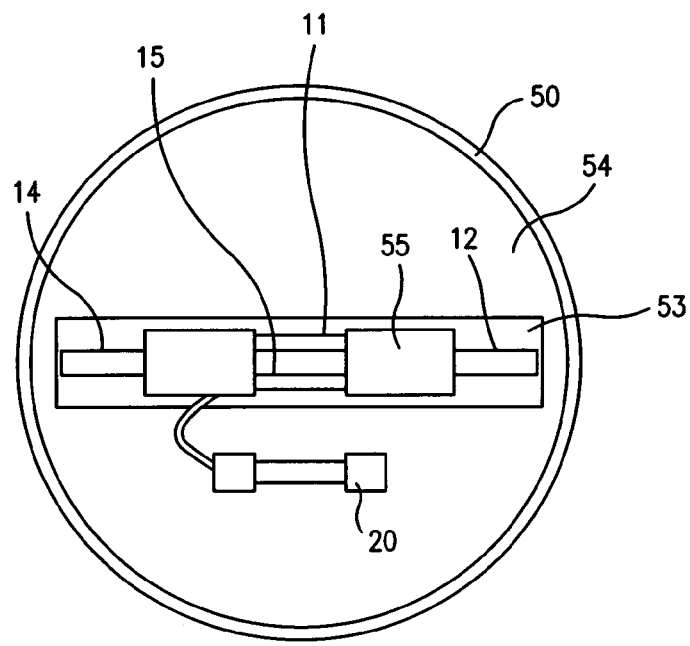
FIG. 3A shows a top view of a pressure transducer and compensating array according to this invention.
Figure 3B:
FIG. 3B shows a cross-sectional view of the transducer of FIG. 3A.

Referring to FIG. 3 there is shown the strain gage piezoresistors, as for example, resistors 11, 12, 14 and 15 of FIG. 1. There is also shown resistor 20 which is the temperature sensing resistor deposited on the metal diaphragm. As can be seen from FIG. 3A, the strain gage piezoresistors as 11, 12, 14 and 15 are bonded to the diaphragm 50 by a glass layer or glass bond 53. The strain gages have contact areas as 55 to enable contact to be made with the bridge circuit. FIG. 3B is a cross section through FIG. 3A whereby reference numeral 50 designates the metal diaphragm which is fabricated from Inconel which basically is a metal alloy. The metal diaphragm has deposited thereon a glass bonding layer 54 with a silicon layer 51 deposited on the glass. A layer of silicon dioxide which is a dielectric layer 53 is formed over the silicon layer 51 and the strain gage piezoresistor sensing network, as for example the resistors 11, 12, 14 and 15 are shown deposited on the dielectric isolation layer of silicon dioxide 53. The layer of silicon dioxide, or the isolation layer, is formed on a silicon wafer 51. The silicon wafer is secured to the metal diaphragm by a glass bonding layer 54 such as a glass frit. As seen, the strain gage piezoresistors are formed on a silicon dioxide layer and the strain gages as 52 are fabricated from silicon and connected in a Wheatstone bridge array. The metal diaphragm is preferably formed from Inconel. In any event, the use of the metal diaphragm employing a piezoresistive strain gage configuration as shown in FIG. 3, is the subject matter of the co-pending application entitled High Temperature Pressure Transducer Employing Metal Diaphragm, Ser. No. 11/453,445 as indicated above. That application shows such transducers. Essentially Inconel is precipitation hardening alloy of nickel-chromium-iron which can be readily fabricated and is machinable. As one can ascertain, there are many different types of Inconel available from different companies, but as indicated, Inconel is a high temperature nickel-chromium alloy, but other metals can be added as well. It is also understood that any high temperature metal can be used as the substrate, and for example may include high temperature steel and so on.

Figure 4:
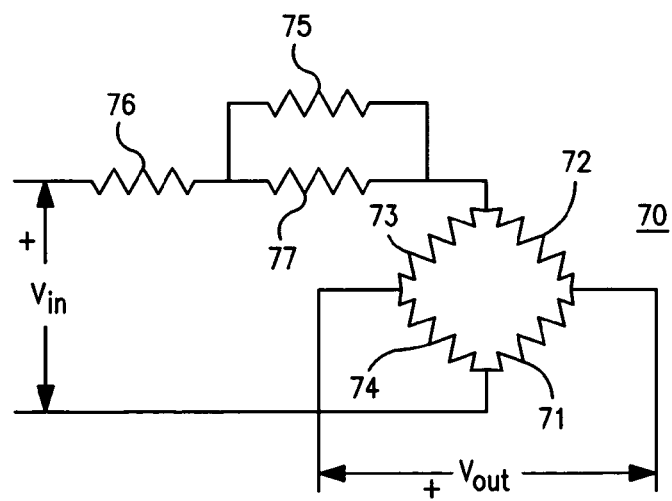
FIG. 4 is a schematic diagram showing an alternate embodiment of temperature compensation for a high temperature transducer according to this invention.

Referring to FIG. 4 there is shown another way to control the compensation of the metal diaphragm. In this case, a span resistor with a given TCR, as resistor 77 is placed in parallel with a fixed resistor 75. The resistors 75 and 77 are in series with a fixed resistor 76. By manipulating the values of the two fixed resistors as 75 and 76, it is possible to use a single value of span resistor 77 such that it can compensate a wider range of Wheatstone bridge configurations, as Wheatstone bridge 70. As seen, the Wheatstone bridge 70 includes piezoresistors 71, 72, 73 and 74, as for example those piezoresistors shown in FIG. 3A designated as 11, 12, 14 and 15. In regard to this, by shunting the span resistor 77, one decreases the overall TCR of the pair and decreases the resistance while adding a span resistor decreases the TCR and increases the resistance. By using these resistors together, one can create any TCR and resistance that is needed. The use of the above noted compensation techniques allows for accurate compensation of any transducer showing a positive TCS such as pressure transducers using metal diaphragms or metal caps. As indicated above, the compensation scheme herein compensates for the undesirable affect that as the temperature rises, the metal diaphragm shows a change in elasticity which therefore affects the operation. If one refers to FIG. 2, as indicated above, one can see the TCR of p-type silicon. It is of course understood that the piezoresistors as 11, 12, 14 and 15 are fabricated from p-type silicon, as indicated in the co-pending application. It is also indicated that the series resistor, as well as the other resistors are also fabricated from p-type silicon and the value of resistance is a function of the amount of doping utilized in conjunction with the resistors. The doping is usually boron and by increasing or decreasing the amount of doping, one can change the value of the resistance. The silicon resistors have a positive TCR as desired with temperature. Thus the above noted method will enable one to compensate a pressure transducer using a metal diaphragm with silicon strain gages in regard to temperature. It should be obvious to one skilled in the art that other techniques or alternate approaches can be discerned and all such techniques are deemed to be encompassed within the spirit and the scope of the claims appended hereto.

What is claimed is:

1. A method for compensating a pressure transducer of the type employing a metal diaphragm having bonded thereto a piezoresistive bridge array wherein the Modulus of Elasticity of said metal diaphragm decreases with increasing temperature to undesirably increase the sensitivity of said transducer with increasing temperature, comprising:

decreasing a voltage applied to said bridge according to said increase in temperature to cause said sensitivity of said transducer to remain relatively stable with increasing temperature;

wherein decreasing the voltage applied to said bridge comprises placing a resistor having a positive temperature coefficient of resistance (TCR) in series with the voltage applied to said bridge.

2. The method according to claim 1, wherein the step of placing a resistor includes placing two fixed resistors in series with the voltage applied to said bridge and shunting one of said fixed resistors with a resistor having a given TCR.

3. The method according to claim 1, wherein said piezoresistor is a p-type silicon resistor.

4. The method according to claim 1, wherein said piezoresistive bridge array is a Wheatstone bridge array.

5. The method according to claim 1, further comprising placing said resistor on said metal diaphragm close to said array.

6. The method according to claim 5, further comprising fabricating said resistor from p-type silicon.

7. The method according to claim 1, wherein said metal diaphragm is fabricated from a nickel alloy.

8. The method according to claim 6, wherein said resistor is insensitive to pressure applied to said diaphragm due to the crystallographic orientation of said resistor on said diaphragm.

9. The method according to claim 6, further including the step of doping said silicon with boron to control the value of said resistor.

* * * * *